United States Patent [19]

Strandgren

[11] Patent Number: 4,507,049
[45] Date of Patent: Mar. 26, 1985

[54] WHEEL INTENDED TO WORK WITH A FLUID

[76] Inventor: Carl B. Strandgren, 12 chemin de la Plaisante, 1012 Lausanne, Switzerland

[21] Appl. No.: 390,029

[22] Filed: Jun. 18, 1982

[30] Foreign Application Priority Data

Jun. 19, 1981 [CH] Switzerland .................. 4061/81

[51] Int. Cl.³ .................................. F03D 7/06
[52] U.S. Cl. ........................ 416/51; 416/17; 416/119
[58] Field of Search ............... 416/17, 111, 119, 44 A, 416/50 A, 51 A, 52 A, 53, 108 R, 108 A, 111 A, 112 A, 116

[56] References Cited

U.S. PATENT DOCUMENTS

| 441,461 | 11/1890 | Avet | 416/111 |
|---|---|---|---|
| 1,432,700 | 10/1922 | Kirsten | 416/111 |
| 1,465,593 | 8/1923 | Barrett et al. | 416/111 |
| 1,753,252 | 4/1930 | Strandgren | 416/112 |
| 1,775,593 | 9/1930 | Kahn | 416/108 |
| 1,885,640 | 11/1932 | Strandgren | 416/108 |
| 1,921,534 | 8/1933 | McCrosky | 416/108 |
| 2,023,750 | 12/1935 | Strandgren | 416/108 |
| 2,063,549 | 12/1936 | Hale | 416/53 X |
| 2,291,062 | 7/1942 | Schneider | 416/108 A |
| 2,580,428 | 1/1952 | Heuver | 416/119 X |
| 2,688,285 | 9/1954 | Stockett et al. | 416/53 X |
| 4,260,328 | 4/1981 | Hamel | 416/17 |
| 4,380,417 | 4/1983 | Fork | 416/108 |
| 4,383,801 | 5/1983 | Pryor | 416/119 X |

FOREIGN PATENT DOCUMENTS

| 114323 | 9/1929 | Austria | 416/108 |
|---|---|---|---|
| 153685 | 6/1938 | Austria | 416/111 |
| 59968 | 7/1942 | Denmark | 416/111 |
| 304433 | 3/1918 | Fed. Rep. of Germany | 416/112 |
| 742788 | 12/1943 | Fed. Rep. of Germany | 416/17 |
| 860466 | 12/1952 | Fed. Rep. of Germany | 416/119 |
| 2826180 | 12/1979 | Fed. Rep. of Germany | 416/17 |
| 1014530 | 8/1952 | France | 416/17 |
| 2017230 | 10/1979 | United Kingdom | 416/17 |

Primary Examiner—Everette A. Powell, Jr.
Attorney, Agent, or Firm—Emory L. Groff, Jr.

[57] ABSTRACT

A wheel intended to work with a fluid includes wing-shaped components (2) arranged around a central shaft (1) generally perpendicular to the direction of relative movement of the fluid (5). The wing-shaped components are articulated along pivoting axes (3) parallel to the central shaft and their orientation during the rotation around the central shaft is determined by a control mechanism (6,7,10, 11 and 16) made so that, in each angular position of the wheel, the planes (12) aligned along the pivoting axes of the wings and perpendicular to the main planes of the latter intersect approximately along the same straight line (13) located on the outside of the trajectory cylinder of the axes of the wings (4). The control mechanism has, for this purpose, an annular part (6) with an axis of rotation (8) parallel to but distinct from that of the central shaft (1) and adjustment parts (10) sliding on rods (9) mounted tangentially to annular part (6). The adjustment parts (10) work with slides (11) solid with the wing-shaped components (2) and are moved simultaneously in directions tangential with regard to the annular part (6) by means of an adjustment ring (16). The speed of rotation of the wheel can thus be kept constant preventing numerous breakdowns due to accidental racing of the wheel.

2 Claims, 6 Drawing Figures

WHEEL INTENDED TO WORK WITH A FLUID

This invention relates to a wind engine in the form of a wheel comprising wind-shaped components arranged around a central shaft and articulated between two supports along a pivoting axis parallel to the central shaft.

Such wheels are known, for example and are described in German Pat. No. 28.26.180 and British Pat. No. 2,017,230, in which the movement of the components around their pivoting axis is periodic and the period is the same as that of a revolution around the central axis. The wheel comprises a mechanism for controlling the movement of components made so that, in each angular position of the wheel during its rotation around the central shaft, the planes aligned along the pivoting axes of the components and perpendicular to the main planes of the latter intersect along a single straight line which is located on the outside of a cylinder generated by the axes of said components during their rotation around the central axis and which is included in the plane passing through the central axis and perpendicular to the direction of movement of the fluid. The mechanism comprises at least one annular part with an axis of rotation parallel to but distinct from that of the central shaft connected to one of the supports so as to assure an angular movement identical with the annular part around its axis of rotation and to the wheel around the axis of rotation of the central shaft. Also, guide parts equal in number to the components are connected to the annular part and intended to work with slides fastened to the components to permit control of the speed of rotation of the wheel.

In these wheels, the guide parts are rigidly fastened to the annular part. To adjust the speed of rotation of the wheel, the annular part is turned at a certain angle around its center of rotation and the guide parts make a circular movement centered on the center of rotation of the annular part. It can be geometrically demonstrated that such adjustment by circular movement of the adjustment parts makes it possible only very approximately to reach such an orientation that the planes aligned perpendicular to the winds intersect along a single straight line which is located on the outside of said cylinder and which is included in the plane passing through the central axis and perpendicular to the direction of movement of the field. Such slight differences in the orientation of the wings compared to the theoretical orientation can bring about a considerable reduction in efficiency.

Another drawback of said wheels resides in the fact that adjustment by complete rotation of the annular part in relation to the wheel necessitates a complicated adjustment device having a large number of parts, causing efficiency losses by friction and also an increasing number of breakdowns.

This invention has as its object to eliminate these drawbacks and, for this purpose, it is characterized by the fact that the guide parts are mobile in relation to the annular part and connected to the latter by an adjustment device arranged so as to move simultaneously all the guide parts in a predetermined movement in relation to said annular part.

According to a preferred embodiment of the invention, said adjustment parts are moved in tangential or radial directions in relation to the annular parts and this adjustment is controlled by a centrifugal governor.

The advantages obtained as a result of this invention consist essentially in adjustment of the wings being geometrically precise making possible a high efficiency, and also in the adjustment mechanism consisting of a small number of components that require very little maintenance and that makes possible a relatively small construction cost.

The accompanying drawing represents diagrammatically and by way of example, a preferred embodiment and two modifications of the wheel which is the object of the invention.

FIG. 1b is an elevation view of the wheel illustrated in FIG. 1a;

Figure 1A:
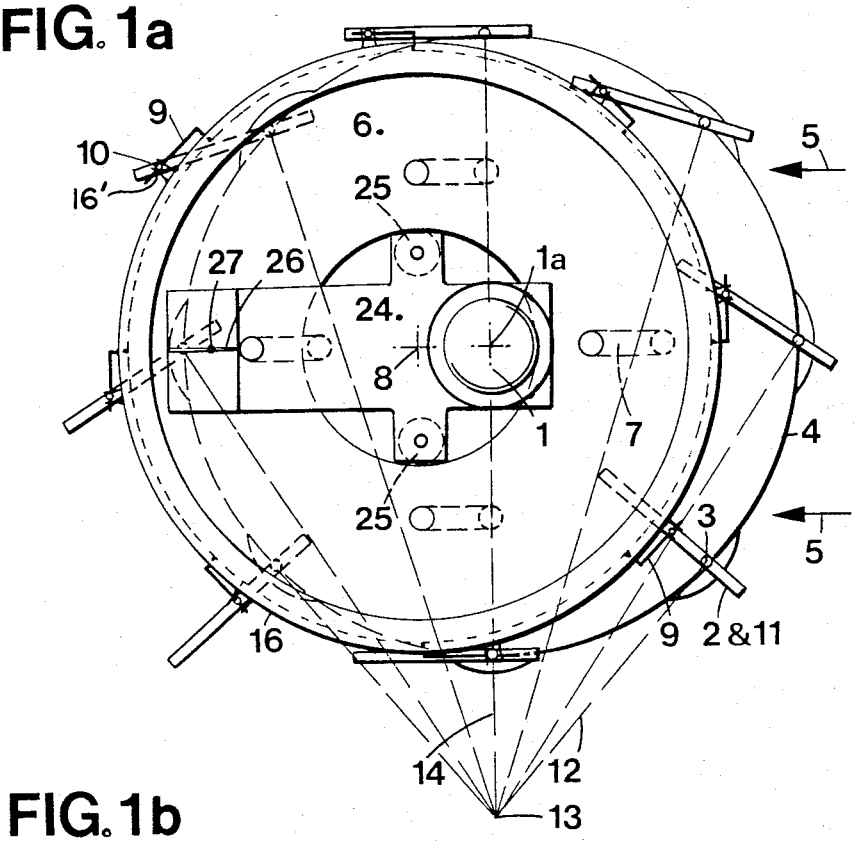
FIG. 1a is a diagrammatic plan view of the wheel.
Figure 1B:
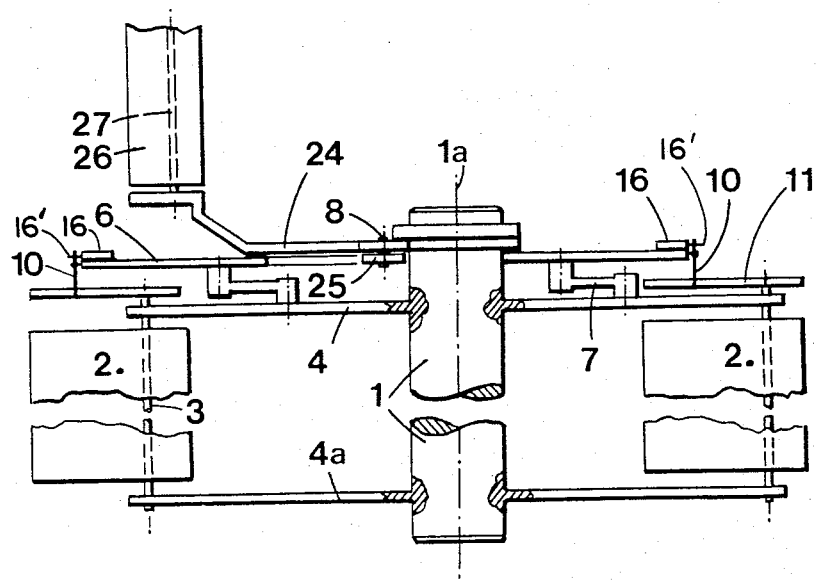

The wheel diagrammatically shown in FIGS. 1a and 1b constitutes a wind engine and has a vertical shaft 1, around which are arranged wings 2, held by pins 3 located parallel to vertical shaft 1 and mounted to turn between two supports generally circular in shape 4 and 4a, having axis 1a of the vertical shaft as center of rotation. Further, the wheel has a device that controls the orientation of the wings during their rotation around shaft 1. This device comprises an annular part 6, connected by four connecting rods 7 to circular part 4. These connecting rods assure an angular movement identical with annular part 6 around its center of rotation 8 and with circular parts 4 and 4a around their axis 1a, these two axes being parallel and separate from each other. This arrangement makes it possible to orient center 8 in direction 5 of movement of the fluid with regard to vertical shaft 1. A cross-shaped part 24 is mounted to turn freely on shaft 1 and has on its side arms two disks 25 that turn on vertical axes. These disks rest against the inner edge of annular part 6. The fourth arm is provided with a vane-shaped component 26 able to be oriented on axis 27. As a result of this arrangement, the movement around the two axes of rotation 1a and 8 is very well stabilized and the device for controlling the movement of the wings is kept constantly in the correct position with regard to the movement of fluid 5 to pick up its energy.

Annular part 6 has at its periphery rods 9 equal in number to the number of wings 2 and oriented tangentially to a circle with a diameter approximately equal to the trajectory circle of the axes of the wings. Each of these rods carries a guide part in the shape of a stud 10, fixed in a determined position and intended to cooperate with a slide 11 solid with pin 3 of each wing, the slide being parallel to the main plane of the wing. The studs 10 corresponding to each of the wings occupy an identical position on rods 9 and are adjusted by a ring 16. The ring is provided with a plurality of bifurcated members 16' integral with the peripheral edge of said ring and extending angularly therefrom. The members 16' are equal in number to the guide parts or studs 10 which are confined between the arms of said members and are moved when said ring is rotated. For any given position of these studs on the rods, planes 12 passing through the axes of wings 3 and perpendicular to the main planes of wings 2 intersect approximately along the same straight line 13 located on the outside of the trajectory circle of the axes of wings 3 on a plane 14 perpendicular to the plane determined by the two axes of rotation 1a and 8 and passing through axis of rotation 1a.

The position of studs 10 on rods 9, precisely defines the movement of the wings and determines the position of intersection line 13 on plane 14. If the studs are placed near the fastening points of the rods, intersection line 13 is in a position tending to infinity and the wings are approximately parallel. The speed of rotation is zero. If now all of the studs on rods 9 are simultaneously moved by turning ring 16 so as to increase distances 15, the radius separating straight line 13 from axis 1a decreases in inverse proportion and the speed of rotation of the wheel increases gradually for a given speed of movement of the fluid.

When the wheel makes a clockwise rotation around axis 1a, the wings turn in the opposite direction around axes 3. To an outside observer, the wings seem driven by an oscillation movement centered on straight line 13, intersection of the planes perpendicular to the wings.

Figure 5:
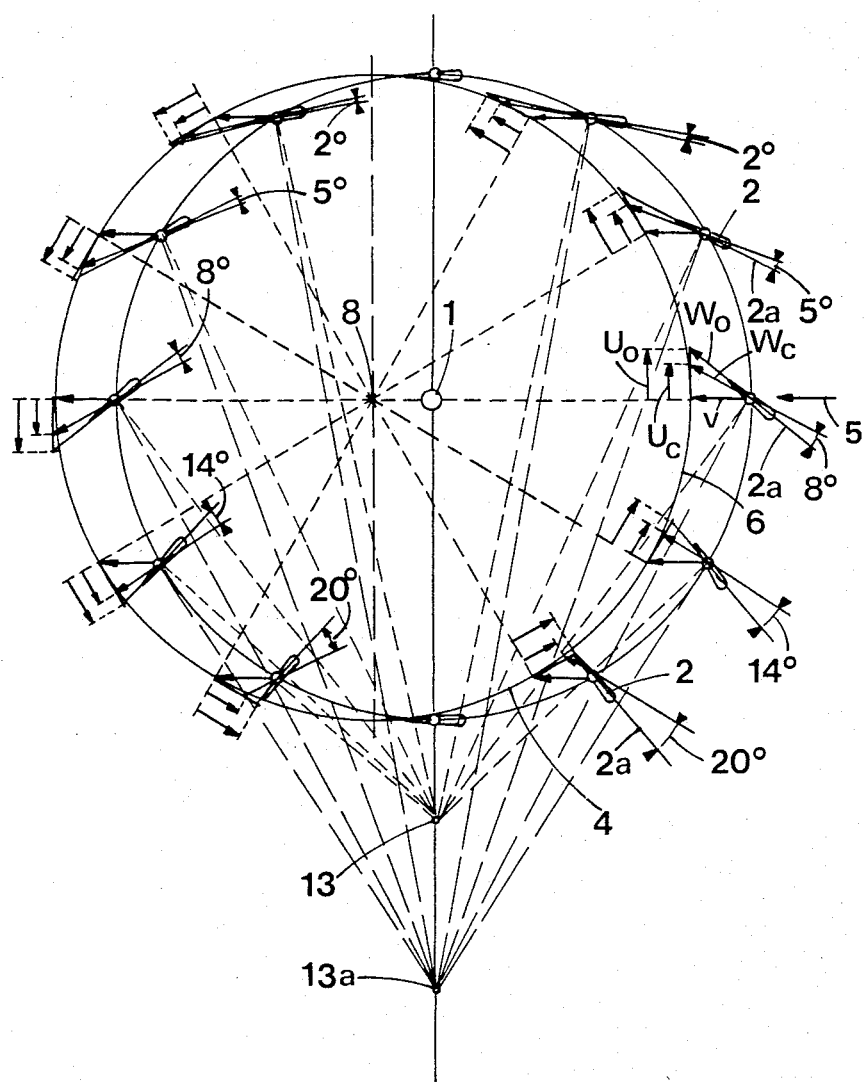
FIG. 5 illustrates the operating principal of a wheel according to the invention.

Referring to FIG. 5, the wheel is driven by a fluid in motion having a speed V. If the wheel is not subjected to any load, the wheel is driven at a peripheral speed $U_O$, which in combination with speed V gives a resulting speed $W_O$ of the wheel with regard to the fluid in movement. Wing-shaped components 2 are oriented so that their main plane 2a is parallel to vector $W_O$ and so that the perpendiculars to the wings intersect in a single intersection 13.

If the wheel is now subjected to a load, its speed of rotation decreases and the peripheral speed corresponds only to a value $U_c$. The fluid is then moved in relation to the wing in movement at a resulting speed represented by vector $W_c$ which makes, with main plane 2a of the wings, a variable angle of incidence depending on the angular position occupied by the wing. The perpendiculars at these actual resulting speeds $W_c$ intersect at a point 13a which, by definition, is the momentary center of rotation. In the example illustrated in FIG. 5, the load is such that the actual peripheral speed $U_c$ under load is decreased 27% in relation to the peripheral speed without load and vectors $W_c$ thereby make, with the main planes of wings 2a, an angle of incidence varying from 0° to about 20°.

Figure 2:
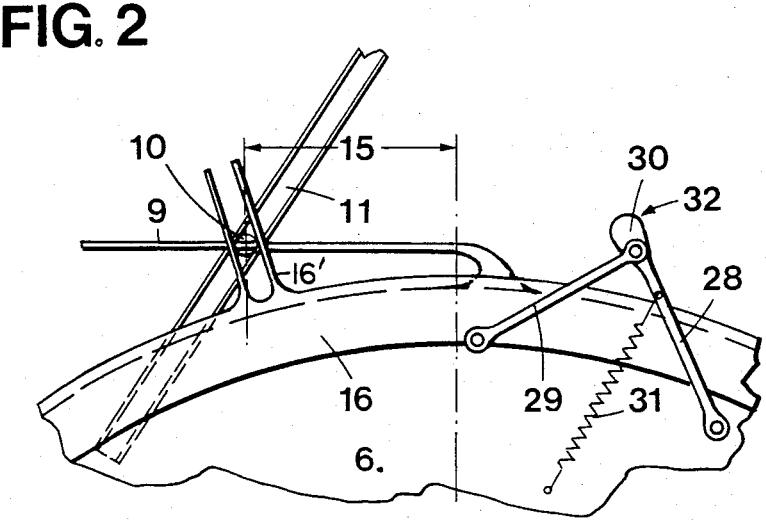
FIG. 2 shows, in detail, a part of the mechanism for control of the movement of the wings.

To keep the speed of rotation of the wheel constant independently of the variations of the load and of the relative speed of the fluid, the angle of incidence of the wings can be controlled by an automatic adjustment device acting on adjustment ring 16 which in turn makes it possible to move all guide parts 10 on rods 9 in reference to FIGS. 1 and 2. This device can be made by various means, mechanical or electronic. An example of a mechanical embodiment is shown in FIG. 2, by a centrifugal governor 32. The latter has an arm 28, fastened by one of its ends to annular part 6 and another arm 29 mounted by one of its ends on adjustment ring 16. A fly-weight 30 subjected to the centrifugal force acts against the action of spring 31 and in this way makes it possible to correct variations in the speed of rotation by an adjustment of the angle of incidence of the wings.

Figure 3:
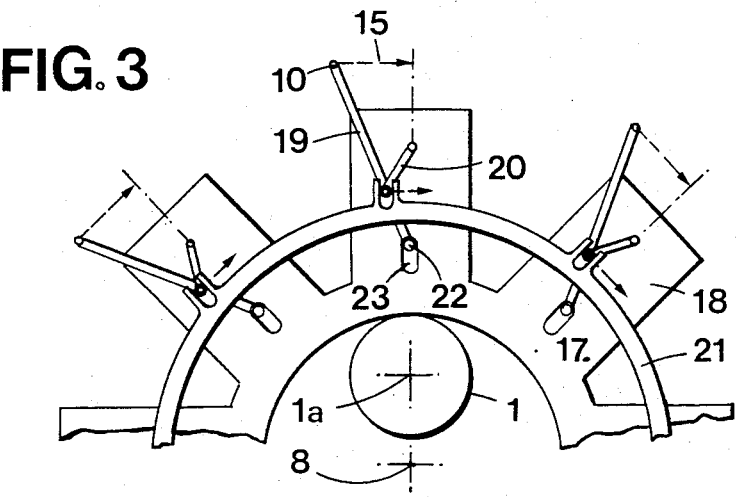
FIGS. 3 and 4 represent two modifications of said control mechanism.

The embodiment of the control device of the wings represented in FIG. 3 comprises an annular part 17 provided with as many arms 18 on its periphery as the wheel has wings. Adjustment of the orientation of the wings is also produced by guide pieces or studs 10 that work with slides rigidly connected to the pivoting axes of the wings, but the movement of the studs in an approximately tangential direction is done by a device comprising a sliding rod 19, a link rod 20 and an adjusting ring 21. Each of studs 10 is fastened approximately at one end of rod 19, the other end of the latter pin 22 able to slide in radial direction in a slide 23, provided on annular part 17. Further, rod 19 is connected to the annular part by link rod 20 mounted to pivot by one of its ends on one of arms 18 of annular part 17 and by the other end on rod 19. This link rod is intended to guide the movement of the rod so that, when the latter is moved, said stud 10 makes a movement in a direction approximately tangential to a circle with a diameter approximately equal to the trajectory circle of the axes of the wings. Adjusting ring 21 can be controlled by a centrifugal governor 32 similar to that described in reference to FIG. 2.

Figure 4:
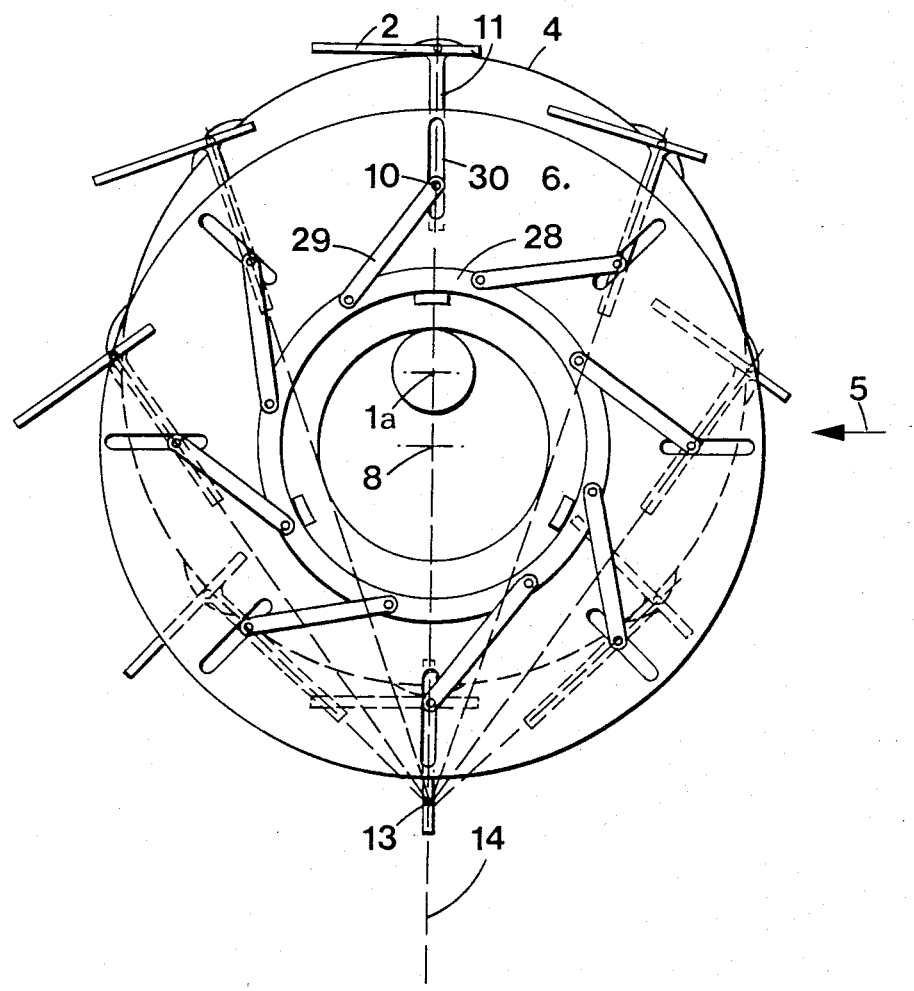

Another embodiment of the device for control of the wings, illustrated in FIG. 4, is distinguished by the fact that slides 11 and corresponding wings 2 form an angle of 90° between them. In this case, the plane passing through the axes of rotation 1a and 8 of the vertical shaft, or of annular part 6, must no longer be parallel to the direction of movement of the fluid, as in the embodiment according to FIG. 1, but perpendicular to this direction. Adjustment of the position of the straight line of intersection 13 on plane 14 is done by moving simultaneously and in an identical manner all guide pieces or studs 10, working with slides 11, in a radial direction, in relation to center of rotation 8 of annular part 6.

Such adjustment can be performed by a ring 28, on which rods 29 are mounted to pivot by one of their ends, the other end of these rods being fastened to studs 10. The latter go through the annular part by radial slots 30 to work with slides 11 oriented perpendicular to wings 2.

Ring 28 can, as before, be controlled by a centrifugal governor, not represented in FIG. 4.

It is clearly understood that the embodiments described above present no limiting character and that they can receive any desirable modifications without thereby going outside the scope of the invention.

I claim:

1. In a wheel intended to work with a fluid comprising a plurality of wing-shaped components (2) arranged around a central shaft (1) and pivoted between two circular supports (4,4a) along a pivoting axis parallel to said central shaft (1), the movement of said wing-shaped components (2) around their pivoting axis being periodic and the period being the same as that of a revolution around the central axis (1), said wheel comprising means for controlling the movement of said wing-shaped components so that, in each angular position of the wheel during its rotation around the central shaft, the planes aligned along the pivoting axes of said components and perpendicular to the main planes of the latter intersect along a single straight line at a point which is located on the outside of a cylinder generated by the axes of said components during their rotation around the central shaft and which is included in the plane passing through the central axis and perpendicular to the direction of movement of the fluid, said means for controlling the movement of said wing-shaped components comprising at least one annular part (6) with an axis of rotation parallel to but distinct from the axis of rotation of said central shaft (1), rods (7) connecting said annular part (6) to one of said circular supports (4,4a) so as to assure an identical angular movement of said annular part (6) around its axis of rotation and the rotation of said wheel around said central shaft (1), a slide (11) fixedly connected to each of said wing-shaped components (2), the improvement comprising: means (9,16) to permit adjustment of the speed of rotation of said wheel, said means comprising a plurality of rods (9) rigidly attached to said annular part (6) at the outer periphery thereof, said rods being equal in number to the number of wing-shaped components (2) and oriented tangentially to said annular part (6), a guide part (10) mounted on each of said rods (9), each said slide (11) being parallel to the main plane of its related wing-shaped component (2) and cooperating with a related guide part (10), a rotatable ring (16) overlying said annular part (6), means on said ring engaging each of said guide parts (10) whereby upon rotation of said ring (16) all of said guide parts (10) and said rods (9) are moved simultaneously in a perpendicular manner relative to said annular part (6).

2. A wheel according to claim 1 wherein, said adjustment means includes a centrifugal governer (32) controlling the relative movement of said adjustment ring (16) in relation to said annular part (6), said governor comprising a pair of arms (28,29), connected to each other at one of their respective ends, the other end of one of said arms connected to said adjustment ring (16) and the other end of the other arm connected to said annular part (6) and means (30,31) acting on said arms to correct variations in the speed of rotation of said wheel.

* * * * *